Nov. 9, 1954
H. A. DICKSON
2,693,993
RECORDER
Filed Feb. 17, 1950
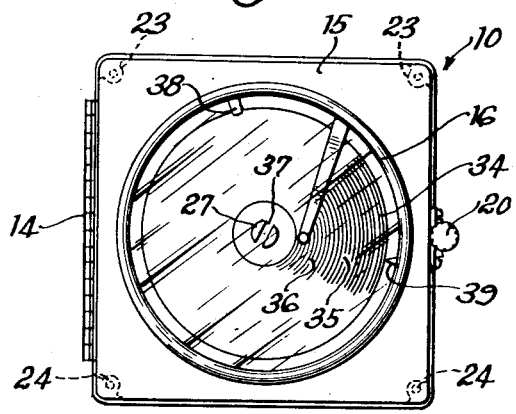
INVENTOR.
Hunter A. Dickson
BY
Mason, Kolehmainen,
Rathburn & Wyss
Attys United States Patent Office 2,693,993
Patented Nov. 9, 1954

2,693,993

RECORDER

Hunter A. Dickson, Chicago, Ill.

Application February 17, 1950, Serial No. 144,786

5 Claims. (Cl. 346—123)

This invention relates to recorders, more particularly to replaceable chart recorders of the type wherein a condition responsive marking element is arranged to produce a continuous record on a chart which is moved as a function of time, and the invention has for an object the provision of a compact, inexpensive, readily adjustable and reliable recorder of this character.

Various types of recorders capable of recording various conditions such as temperature, pressure, vacuum or electrical quantities and the like have heretofore been proposed, but in most cases such recorders have been too bulky and cumbersome for adaptation to numerous everyday uses or have been too expensive to justify their use in many types of operations wherein a continuous record of variable conditions would be of aid to the operator. It is accordingly a further object of the invention to provide an improved recorder which may be manufactured substantially entirely from stamped or similarly fabricated parts which may be readily assembled, which may be quickly and easily calibrated, repaired and adjusted and which may be employed either as a self-contained or as a remotely controlled recorder of various conditions.

Another object of the invention is the provision of a recorder having improved means for removably supporting, driving and adjusting a replaceable chart.

Still another object of the invention is the provision of a recorder having improved pen or marking element supporting and operating means.

A still further object of the invention is the provision of a recorder of the above indicated character wherein all of the component parts are supported on a single dial plate which may be readily removed from the recorder casing for inspection or servicing.

In carrying out the invention in one form, a recorder is provided having a dial plate through a central portion of which projects a rotatable spindle having a slotted end, and a replaceable chart is provided having centrally disposed openings shaped to receive the portions of the spindle on opposite sides of the slot, with the portion of the chart between the openings extending into the slot to drivingly engage the spindle and the chart. Also mounted on the dial in inwardly facing relation adjacent the outer edges thereof are a plurality of clip members for loosely receiving the marginal portions of the chart when a chart is disposed on the spindle. Also mounted on the dial plate, on the front face thereof, is a marking element including a supporting arm which is pivotally mounted in depending relation for free swinging movement about a transverse axis, and the dial plate is mounted in rearwardly tilted relation whereby the marking element is held in contact with the chart by gravity. In addition, the supporting arm for the marking element is provided adjacent the pivoted end thereof with a spring finger extending beyond the pivot and adapted, when the arm is swung outwardly away from the chart, to frictionally engage the pivotal mounting means and retain the arm in a raised position during replacement of a chart on the dial plate. In addition to the foregoing elements, the recorder includes suitable clock means supported on the dial plate rearwardly thereof and having a friction drive to the spindle which permits rotation of the spindle independently of the clock means to adjust the chart on the dial, and the condition responsive means mounted on the dial rearwardly thereof is provided with a shaft which extends through the dial to support and operate the marking element.

For a more complete understanding of the invention, reference should now be had to the drawing, in which:

Fig. 1 is a front elevational view of a recorder embodying the present invention;

Fig. 2 is a side elevational view of the recorder shown in Fig. 1;

Fig. 3 is a front elevational view of the dial plate incorporated in the recorder of Figs. 1 and 2;

Fig. 4 is a side elevational view of the dial plate shown in Fig. 3 and the various operating components mounted thereon;

Fig. 5 is a rear elevational view of the dial plate with the clock means shown in broken lines more clearly to illustrate the construction;

Fig. 6 is a top plan view of the dial plate and component parts;

Fig. 7 is a sectional view on a somewhat enlarged scale, taken along the line 7—7 of Fig. 6;

Fig. 8 is a fragmentary detail sectional view on an enlarged scale taken along the line 8—8 of Fig. 3; and Fig. 9 is a detail sectional view similar to Fig. 8 showing the marking element in a raised position.

Referring now to the drawing, the invention has been shown as embodied in a recorder 10 comprising a casing which comprises an open ended body member 11, the rear face of which is closed by a suitable rubber gasket 12 and a face plate 13. Connected to the front face of the body member 11 by a suitable hinge means 14 is a cover member 15 having a circular opening therein for supporting a glass window 16, through which the replaceable chart to be hereinafter described is visible. The cover member 15 is provided with a peripherally extending rubber gasket 17, and in order to provide for tight closure of the recorder casing, a spring pressed latch means is provided which comprises a bracket 18 secured to the cover member 15 for supporting a reciprocatable latch member 19 on the outer end of which is provided a knurled knob 20 and on the inner end of which is provided a latch hook 21. Secured to the body member 11 of the casing is a latch plate 22 having a suitable aperture therein (not shown) for receiving the latch hook 21. Normally the latch member 19 is held in a position to the left of that shown in Fig. 2 by a spring (not shown) disposed between the knob 20 and the bracket 18, and closure and locking of the casing is effected by forcing the latching member inwardly against the spring until the latch hook 21 projects through the aperture in the latch plate 22, whereupon the latch member 19 may be rotated by means of the knob 20 to catch the hook 21 behind the latch plate 22, the force of the spring and the rubber gasket 17 insuring a tight closure.

Formed integrally with the body portion 11 of the casing and preferably at the corners thereof, are two pairs of supporting posts 23 and 24 for supporting within the casing a dial plate 25 (Figs. 3, 4 and 5). As shown in Fig. 2, the upper pair of supporting posts 23 are somewhat shorter than the lower pair of posts 24 so that the dial plate 25 is supported within the casing in rearwardly tilting relation, as will be more fully explained hereinafter.

Referring now to Figs. 3 to 9, inclusive, the dial plate 25 is provided on the rear surface thereof with a bearing or hub member 26 through which extends a rotatable spindle 27, the forwardly extending portion of which is provided with a slot 28 which is preferably diametrically arranged therein. The spindle 27 extends rearwardly of the bearing 26 and loosely supports a suitable driving gear 29 adapted to mesh with the final gear or cog 30 of a suitable clock means 31 which is supported on the rear of the dial plate, as, for example, on supporting posts 32. The clock means may be of any desired character, either electrically or spring driven, and a driving connection between the clock means 31 and the spindle 27 is provided by means of a spring disk 33 which is secured under compression to the extending end of the spindle 27 so as to frictionally bear against the driving gear 29 and provide a friction driving connection which is effective to cause rotation of the spindle by the clock means but which will permit independent rotation of the spindle for adjustment purposes, as hereinafter described.

The spindle 27 functions to support and drive suitably formed removable chart members such as the circular chart 34 shown in Figs. 1 and 3. The chart 34 is entirely conventional in so far as the calibration thereof is concerned, and includes a plurality of arcuately extending time calibrations 35 and a plurality of circular condition calibrations 36 which may indicate temperature, pressure, vacuum or any other desired quantity, depending upon the use to which the recorder is to be put. In accordance with the present invention, the chart 34 is provided at its central portion with a plurality of apertures which are shaped to receive the portions of the spindle on opposite sides of the slot 28 and which are spaced apart by a chart portion 37 which extends through the slot in the spindle 27 so as drivingly to engage the chart with the spindle.

Secured to the dial plate 25, adjacent the outer edges thereof, is a pair of clip members 38 and 39, which are secured by means of suitable screws 40 and 41, the clip members 38 and 39 being slightly spaced from the dial plate so as to loosely receive the marginal portions of the chart 34 to position the chart on the dial plate while permitting rotation of the chart relative to the dial plate. As shown, one of the clip members, preferably the clip member 39, is shaped to form a pointer which serves as the time pointer in cooperation with the arcuate calibrations 35 on the chart 34. By reason of the frictional connection between the spindle 27 and the clock means 31, proper zeroing or time adjustment of the chart 34 on the dial plate 25 may be effected merely by inserting the end of a screwdriver or similar tool into the spindle slot 28 and rotating the spindle until the proper time calibration mark 35 is opposite the time pointer 39.

Extending through a suitable aperture in the dial plate 25 is a rotatable shaft 43 which, as will be more fully described hereinafter, constitutes part of the condition responsive means of the recorder and which carries on its extending end a yoke 44 having spaced apart ears 45 adapted to receive the opposite ends of a pivot pin 46 which forms a part of the recorder marking element and from which extends a supporting arm 47 on the free end of which is carried a suitable marking pen 48 or other marking device. The supporting arm 47 is thus pivotally mounted for free swinging movement, and by reason of the fact that the dial plate 25 is mounted in rearwardly tilted relation, as heretofore mentioned, the marking element or pen 48 is maintained in contact with the chart 34 by gravity. Adjacent the pivoted end thereof, the supporting arm 47 is provided with a rearwardly extending spring finger 49 which is adapted, when the arm 47 is elevated from its normal depending position to a raised position that is approximately horizontal or above, as shown in Fig. 9, to frictionally engage the yoke 44 so as to retain the arm in its raised position, thereby facilitating removal and replacement of the chart 34. Thus, in order to replace the chart with a new or different chart, it is necessary only to swing the arm 47 outwardly to a raised position and to then lift the chart off the spindle 27 while withdrawing the edge portions thereof from under the clips 38 and 39. A new chart may then be inserted beneath the clips and the arm 47 returned to its operating position.

Although, as previously mentioned, the condition responsive means for operating the marking pen 48 over the surface of the chart 34 may take various forms depending upon the particular conditions to be recorded, the embodiment of the invention shown in the drawing constitutes a self-contained temperature recorder in which the condition responsive means comprises a spiral bimetallic element 50 which is suitably supported on the rear face of the dial plate 25 and connected, as will be hereinafter described, to operate the shaft 43 on which the marking pen is supported. As shown, the shaft 43 is journaled in a yoke structure 51 which is secured to the rear surface of the dial plate 25 and carries, adjacent its rear end, a depending arm or lever 52 which is secured to the shaft by a suitable screw 53 and which has formed integrally therewith a pair of divergent stop arms 54 arranged to limit the movement of the shaft 43 by engagement with transverse portions of the yoke 51.

The helical bimetallic element 50 is secured at its inner end to a tubular support 55, as shown best in Fig. 7, which carries at its inner end a suitable spring member 56 and which is adapted to be removably supported by a mounting post 57 fixed to the dial plate 25. The post 57 has a reduced threaded end portion 58 adapted to be engaged by a nut 59 for holding the tubular support 55 on the post 57 with the spring 56 under compression. Rotatably supported on the post 57 between the spring 56 and the dial plate 25 is an adjusting disk 60 which carries a segment gear 61 (Fig. 5) adapted to mesh with a cog 62 carried on a stub shaft 63 which extends through the dial plate 25 and has its forward end slotted to permit adjustment of the cog 62 by means of a screwdriver or similar tool. Preferably the stub shaft 63 is provided with an integral disk portion 64, as shown in Fig. 5, which underlies the gear segment 61 so as to retain the stub shaft 63 and the cog 62 in position upon assembly of the component parts. It will be understood that the spring 56 when compressed by tightening down the nut 59 provides a friction type driving connection between the disk 60 and the tubular support 55 for the bimetallic element 50 so that rotation of the stub shaft 63 is effective through the cog 62, the gear segment 61 and the disk 60 to adjust the angular position of the bimetallic element on the post 57, thus to adjust the bimetallic element and through it the marking pen 48 to the desired starting or zero position with respect to the chart 34, and likewise to adjust the range of temperature which the instrument will record.

By the provision of the range adjustment feature it is possible to record over a multiplicity of temperature ranges. For example, assuming that a temperature change of 45° is effective to move the marking pen 48 entirely across the chart 34, the recorder, simply by adjustment of the stub shaft 63, may be employed to record as desired temperatures from 0° to 45°, 45° to 90°, 90° to 135°, etc. Thus a smaller chart and a more compact recorder is achieved which has all of the large range advantages of larger recorders.

At its outer end the bimetallic element 50 carries a calibrating arm 65 which, as shown in Figs. 5 and 7, includes a vertically extending slot 66 for receiving a suitable adjusting screw 67 to which is connected a link member 68 which, in conjunction with a similar link member 69 and a spring mechanism 70, affords an operating connection between the bimetallic element 50 and the marker operating shaft 43. While a single link may be provided if desired, connected between the depending link 52 on the marking shaft and the calibrating member 65 on the bimetallic element, the arrangement shown is preferably provided in order to prevent injury to the bimetallic element or the marker upon overranging of the instrument. Thus, as shown, the two links 68 and 69 are provided with longitudinally extending slots for receiving suitable clips, not shown, arranged to bear against the spring retaining disks 71 disposed at opposite ends of the spring 70.

The spring 70 is of sufficient strength so that under normal conditions movement of the link 68 caused by the bimetallic element 50 will be transmitted through the spring 70 to the link 69 without causing compression of the spring. However, under abnormal conditions the spring will be compressed to cause shortening of the linkage at forces insufficient to injure either the marking pen or the bimetallic element. By adjusting the connecting screw 67 in the slot 66 of the calibrating arm 65, the calibration of the bimetallic element so as to effect proper movement of the marking pen 48 may readily be effected. It will be noted, as shown in Fig. 5, that the link 69 is connected to the depending link 52 by a suitable screw 72, and it will thus be seen that the linkage mechanism comprising the links 68 and 69 and the spring 70, the calibrating member 65, the bimetallic element 50, the supporting tube 55, and the spring 56 constitute a removable sub-assembly which may be precalibrated and then assembled in proper relation with the remaining elements of the recorder merely by placing the tube 55 over the post 57, tightening down the nut 59 and securing the link 69 to the link 52 by means of the screw 72. By reason of this sub-assembly arrangement, instruments which are damaged in the field may be repaired simply by obtaining a new, properly calibrated sub-assembly which may be readily assembled in place of the defective parts.

It will, of course, be understood that the bimetallic element 50 may be replaced by a spiral Bourdon tube which may be connected in conventional fashion to a remotely located sensitive bulb to provide a distant reading thermometer recorder or which may be properly connected to respond to pressure or vacuum. Likewise, in order to record electrical quantities suitable electric responsive mechanism may be provided for operating the link 52 and the shaft 43 in response to predetermined electrical conditions.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. In a recorder, a stationary dial plate, a rotatable spindle member extending through said plate and having a slot in the end thereof, a replaceable chart having centrally disposed openings therein shaped to receive the portions of said spindle on opposite sides of said slot with the portion of said chart between said openings extending into said slot to drivingly engage the spindle and the chart, a plurality of inwardly facing clip members mounted on said dial plate for loosely receiving marginal portions of said chart when said chart is disposed on said spindle, means on said dial plate for driving said spindle, and a friction drive between said driving means and said spindle whereby said spindle may be independently rotated by insertion of a tool in said slot to adjust said chart on said dial plate.

2. In a recorder, a dial plate, a rotatable spindle member extending through said plate and having a slot in the end thereof, a replaceable chart having centrally disposed openings therein shaped to receive the portions of said spindle on opposite sides of said slot with the portion of said chart between said openings extending into said slot to drivingly engage the spindle and the chart, a plurality of inwardly facing clip members mounted on said dial plate for loosely receiving marginal portions of said chart when said chart is disposed on said spindle, a marking element including a supporting arm, means pivotally mounting said arm on said plate in depending relation for free swinging movement about a generally horizontal axis whereby said marking element is normally held in contact with said chart by gravity, and means on said arm adjacent the pivotal mounting thereof adapted when said arm is swung outwardly to frictionally engage said pivotal mounting means thereby to retain said arm in a raised position during replacement of a chart on said dial plate.

3. In a recorder, a dial plate, a rotatable spindle member extending through said plate and having a slot in the end thereof, a replaceable chart having centrally disposed openings therein shaped to receive the portions of said spindle on opposite sides of said slot with the portion of said chart between said openings extending into said slot to drivingly engage the spindle and the chart, a plurality of inwardly facing clip members mounted on said dial plate for loosely receiving marginal portions of said chart when said chart is disposed in said spindle, a marking element including a supporting arm, means pivotally mounting said arm on said plate in depending relation for free swinging movement about a generally horizontal axis, means mounting said dial plate in rearwardly tilted relation whereby said marking element is held in contact with said chart by gravity, and a spring finger extending from said arm beyond the pivotal mounting thereof adapted when said arm is swung outwardly to at least a substantially horizontal position to frictionally engage said pivotal mounting means and retain said arm in said position during replacement of a chart on said dial plate.

4. In a recorder, a dial plate, means for mounting a replaceable chart on the front face of said plate for movement relative thereto, a marking element including a supporting arm, means pivotally mounting said arm on said plate in depending relation for free swinging movement about a generally horizontal axis whereby said marking element is normally held in contact with said chart by gravity, said pivotal mounting means including a member mounted on the outer face of said dial plate, and a spring finger extending from said arm beyond the pivotal mounting thereof also extending generally in the same direction as said arm and adapted when said arm is pivoted about said pivotal mounting past dead center to be compressed by engagement with said member in order to retain said arm in a raised position during replacement of a chart on said dial plate.

5. In a recorder, a dial plate, a spindle member extending through said plate, means on the front of said plate and including said spindle member for removably supporting a chart on said plate, clock means supported on said plate rearwardly thereof, friction means connecting said spindle to said clock means in driving relation to effect rotation of said chart by said clock means, said friction means permitting rotation of said spindle independently of said clock means to adjust said chart on said dial, condition responsive means mounted on said dial rearwardly thereof and including a shaft extending through said dial, a yoke mounted on said shaft forwardly of said dial and including a transversely extending pivot pin, a marking element including a supporting arm pivoted on said pin in depending relation for free swinging movement thereon, means mounting said dial plate in rearwardly tilted relation whereby said marking element is held in contact with said chart by gravity for movement relative thereto by said condition responsive means, and means on said arm adjacent said pivot pin adapted when said arm is swung outwardly to frictionally engage said yoke to retain said arm in a raised position during replacement of a chart on said dial plate.

References Cited in the file of this patent

UNITED STATES PATENTS

| Number | Name | Date |
|---|---|---|
| 1,061,121 | Quertier | May 6, 1913 |
| 1,083,045 | Zackey | Dec. 30, 1913 |
| 1,087,256 | Pumphrey | Feb. 17, 1914 |
| 1,120,749 | Schunzmann | Dec. 15, 1914 |
| 1,205,353 | Jones | Nov. 21, 1916 |
| 1,282,621 | Obermaier | Oct. 22, 1918 |
| 1,438,829 | Howell | Dec. 12, 1922 |
| 1,572,207 | Hodgkinson | Feb. 9, 1926 |
| 1,619,241 | Cunningham | Mar. 1, 1927 |
| 1,630,296 | Heesch | May 31, 1927 |
| 2,008,970 | Spitzglass | July 23, 1935 |
| 2,060,984 | Froher et al. | Nov. 17, 1936 |
| 2,440,647 | Vogel | Apr. 27, 1948 |